US009252904B2

(12) United States Patent
Chitambar et al.

(10) Patent No.: US 9,252,904 B2
(45) Date of Patent: Feb. 2, 2016

(54) METHOD AND APPARATUS FOR DISTRIBUTING NETWORK TIMING IN A MESH OPTICAL NETWORK

(75) Inventors: Abhijit S. Chitambar, Naperville, IL (US); Ramasubramanian Anand, Plainfield, IL (US); Kenneth M. Fisher, Aurora, IL (US)

(73) Assignee: Coriant Operations, Inc., Naperville, IL (US)

( * ) Notice: Subject to any disclaimer, the term of this patent is extended or adjusted under 35 U.S.C. 154(b) by 217 days.

(21) Appl. No.: 13/150,637

(22) Filed: Jun. 1, 2011

(65) Prior Publication Data

US 2012/0308226 A1    Dec. 6, 2012

(51) Int. Cl.
*H04B 10/00* (2013.01)
*H04J 14/00* (2006.01)
*H04J 3/14* (2006.01)
*H04J 3/06* (2006.01)

(52) U.S. Cl.
CPC ........ *H04J 3/14* (2013.01); *H04J 3/0641* (2013.01)

(58) Field of Classification Search
CPC ....... H04J 3/0641; H04J 3/14; H04J 14/0284; H04J 14/02; H04J 14/08; H04L 7/00; H04L 7/0075; H04L 7/0008; H04B 10/299; H04B 10/08
USPC ............ 398/25, 140–172, 1–8; 370/503, 351, 370/254, 400, 242
See application file for complete search history.

(56) References Cited

U.S. PATENT DOCUMENTS

| | | | |
|---|---|---|---|
| 4,114,151 A * | 9/1978 | Denne et al. ............... | 342/44 |
| 4,142,069 A * | 2/1979 | Stover ....................... | 370/507 |
| 4,939,752 A * | 7/1990 | Literati et al. .............. | 370/238 |
| 5,615,177 A * | 3/1997 | Yahata ......................... | 368/10 |
| 5,638,379 A * | 6/1997 | Narasimha ........... | H04J 3/0647 370/510 |
| 5,726,979 A * | 3/1998 | Henderson et al. ........ | 370/254 |
| 5,841,779 A * | 11/1998 | Kainulainen ......... | H04J 3/0679 370/503 |
| 5,886,996 A * | 3/1999 | Wolf ........................... | 370/507 |
| 6,144,675 A * | 11/2000 | Wakabayashi et al. ...... | 370/516 |
| 6,185,247 B1 * | 2/2001 | Williams ............. | H04J 3/0638 370/503 |
| 6,317,475 B1 * | 11/2001 | Kasurinen .................. | 375/356 |
| 6,414,959 B1 * | 7/2002 | Asano ................. | H04L 12/5601 370/395.62 |
| 6,418,151 B1 * | 7/2002 | Walter et al. ................. | 370/503 |
| 6,522,629 B1 * | 2/2003 | Anderson, Sr. ............. | 370/236 |
| 6,606,362 B1 * | 8/2003 | Dalzell ................ | H04J 3/0641 370/294 |

(Continued)

OTHER PUBLICATIONS

"Information technology—Open Systems Interconnection—Basic Reference Model: The Basic Model," ISO/IEC 7498-1:1994(E). (pp. 32, 33, 35, 38, 39, 44, 47, and 48).

*Primary Examiner* — Ken Vanderpuye
*Assistant Examiner* — Dibson Sanchez
(74) *Attorney, Agent, or Firm* — Hamilton, Brook, Smith & Reynolds, P.C.

(57) ABSTRACT

The disclosed methods and apparatuses provide a unique and cost efficient approach to using traffic channels of an optical mesh network, and sometimes optical supervisory channels, for carrying timing information (e.g., BITS timing signals), thus eliminating the need to use external BITS sources at remote add/drop nodes of a network. Planning the distribution of timing in such an optical mesh network includes identifying in the network a source node associated with an external timing source, identifying optical light paths between nodes in the network, and, for nodes other than the source node, selecting optical light paths originating either directly or indirectly from the source node to use to derive timing information.

19 Claims, 8 Drawing Sheets

(56) References Cited

U.S. PATENT DOCUMENTS

| | | | |
|---|---|---|---|
| 6,628,674 B1* | 9/2003 | Tanonaka | 370/503 |
| 6,658,579 B1* | 12/2003 | Bell et al. | 713/400 |
| 6,711,411 B1* | 3/2004 | Ruffini | 455/502 |
| 6,714,563 B1* | 3/2004 | Kushi | 370/503 |
| 6,735,392 B1* | 5/2004 | Elahmadi et al. | 398/7 |
| 6,775,300 B2* | 8/2004 | Kuo | 370/503 |
| 6,895,189 B1* | 5/2005 | Bedrosian | H04L 7/033 370/503 |
| 7,035,537 B2* | 4/2006 | Wang et al. | 398/7 |
| 7,126,908 B1* | 10/2006 | Lu et al. | 370/228 |
| 7,136,388 B2* | 11/2006 | Friedrichs et al. | 370/395.62 |
| 7,248,802 B2* | 7/2007 | Grohn | 398/155 |
| 7,251,256 B1* | 7/2007 | Barry et al. | 370/503 |
| 7,308,198 B1* | 12/2007 | Chudak et al. | 398/58 |
| 7,346,279 B1* | 3/2008 | Li et al. | 398/32 |
| 7,613,212 B1* | 11/2009 | Raz et al. | 370/510 |
| 7,649,910 B1* | 1/2010 | Wechsler et al. | 370/503 |
| 7,689,854 B2* | 3/2010 | Ilnicki et al. | 713/400 |
| 7,991,016 B2* | 8/2011 | Cankaya et al. | 370/503 |
| 8,194,636 B1* | 6/2012 | Doherty et al. | 370/350 |
| 8,532,481 B2 | 9/2013 | Karjck et al. | |
| 8,588,613 B1* | 11/2013 | Culpepper | 398/98 |
| 2002/0154354 A1* | 10/2002 | Raj et al. | 359/124 |
| 2002/0159130 A1* | 10/2002 | Sakano et al. | 359/326 |
| 2003/0039272 A1* | 2/2003 | Dudziak et al. | 370/503 |
| 2003/0059160 A1* | 3/2003 | Rikitake | H04J 3/0638 385/24 |
| 2004/0044922 A1* | 3/2004 | Wu | 713/500 |
| 2004/0062278 A1* | 4/2004 | Hadzic et al. | 370/503 |
| 2004/0101311 A1* | 5/2004 | Grohn | 398/154 |
| 2004/0148437 A1* | 7/2004 | Tanonaka | 709/246 |
| 2005/0063383 A1* | 3/2005 | Wisler | 370/389 |
| 2006/0039347 A1* | 2/2006 | Nakamura | H04J 3/0647 370/350 |
| 2007/0053372 A1* | 3/2007 | Liu | H04J 3/0641 370/406 |
| 2008/0144515 A1* | 6/2008 | Ouellette et al. | 370/242 |
| 2008/0170592 A1* | 7/2008 | Hack et al. | 370/503 |
| 2008/0205294 A1* | 8/2008 | Brune et al. | 370/254 |
| 2008/0219175 A1* | 9/2008 | Bedrosian | H04L 12/66 370/250 |
| 2008/0291925 A1* | 11/2008 | Fisher et al. | 370/400 |
| 2009/0147806 A1* | 6/2009 | Brueckheimer | 370/503 |
| 2009/0207863 A1* | 8/2009 | Cheng | H04J 3/0641 370/498 |
| 2009/0290668 A1* | 11/2009 | Nishine | H04J 3/0641 375/356 |
| 2010/0020787 A1* | 1/2010 | Ji et al. | 370/351 |
| 2010/0182980 A1* | 7/2010 | Jobert et al. | 370/336 |
| 2011/0008049 A1* | 1/2011 | Tanonaka et al. | 398/79 |
| 2011/0142077 A1* | 6/2011 | Wong et al. | 370/503 |
| 2011/0158642 A1* | 6/2011 | Barnard et al. | 398/25 |
| 2011/0299853 A1* | 12/2011 | Zampetti | H04J 3/0667 398/98 |
| 2012/0299627 A1* | 11/2012 | Taskin et al. | 327/141 |
| 2013/0039220 A1* | 2/2013 | Ruffini et al. | 370/255 |

\* cited by examiner

METHOD AND APPARATUS FOR DISTRIBUTING NETWORK TIMING IN A MESH OPTICAL NETWORK

BACKGROUND OF THE INVENTION

Networks that transport data may require timing, e.g., digital pulse cycles at precise accuracy. Such timing can be provided by a Building Integrated Timing Supply (BITS) clock. Few network providers, however, are able to provide external BITS clock generators at their traffic add/drop locations to add/drop data traffic synchronously. Prior approaches to this problem include networks based on simplistic ring architectures, which have a natural linearity to optical traffic flow, but mesh optical networks are more complex and mandate the need for advanced tools and apparatuses to implement and validate network timing distribution. Other approaches to distribute timing are based on a singular approach of using an optical channel carrying synchronous network traffic to derive BITS timing at a remote add/drop node and/or using dedicated traffic demands for carrying timing. These approaches are not able to account for network outages due to fiber cuts and their impact on the network timing distribution.

SUMMARY OF THE INVENTION

An example method of planning the distribution of timing in an optical mesh network includes identifying in the network a source node associated with an external timing source, identifying optical light paths between nodes in the network, and, for nodes other than the source node, selecting optical light paths originating either directly or indirectly from the source node to use in deriving timing information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

A node/network element (NE) that adds/drops synchronous traffic requires an accurate and stable BITS clock. An example external BITS clock that may be used is the StarClock™ 200E made by CXRLarus. Ideally, BITS timing is provided to an add/drop node using an external timing source located at or near the node, but such external sources that are associated with the node are expensive, and placing these external sources at all nodes can be cost prohibitive. The disclosed methods and apparatuses provide a unique and cost efficient approach to using traffic channels for carrying timing information (e.g., BITS timing signals), thus, eliminating the need to use external BITS sources at remote add/drop nodes of a network. According to the disclosed embodiments, when such external sources are not available at all add/drop nodes, BITS timing is distributed from nodes that have external timing using optical channels for existing traffic demands. This approach can be used to implement timing distribution across large and complicated mesh networks.

The embodiments disclosed herein provide a unique way to distribute network timing across optical mesh networks (e.g., Dense Wavelength Division Multiplexing (DWDM) networks) by utilizing network traffic demands and, in some embodiments, a optical supervisory channel of the network equipment (e.g., Tellabs 7100) of an optical network. Various embodiments may use optical traffic demands and/or optical supervisory channels to distribute network timing to add/drop nodes remote from the timing sources. These nodes can then act as secondary timing distribution sources.

The embodiments also enable a user to evaluate and define the impact of network outages due to fiber cuts on the timing distribution across the optical mesh network. This allows a user to incorporate and evaluate the impact of the network outages due to multiple fiber cuts across the transport network and provide the network operator with detailed information regarding the impact of various network failures on the distribution of timing in the network.

Figure 1A:
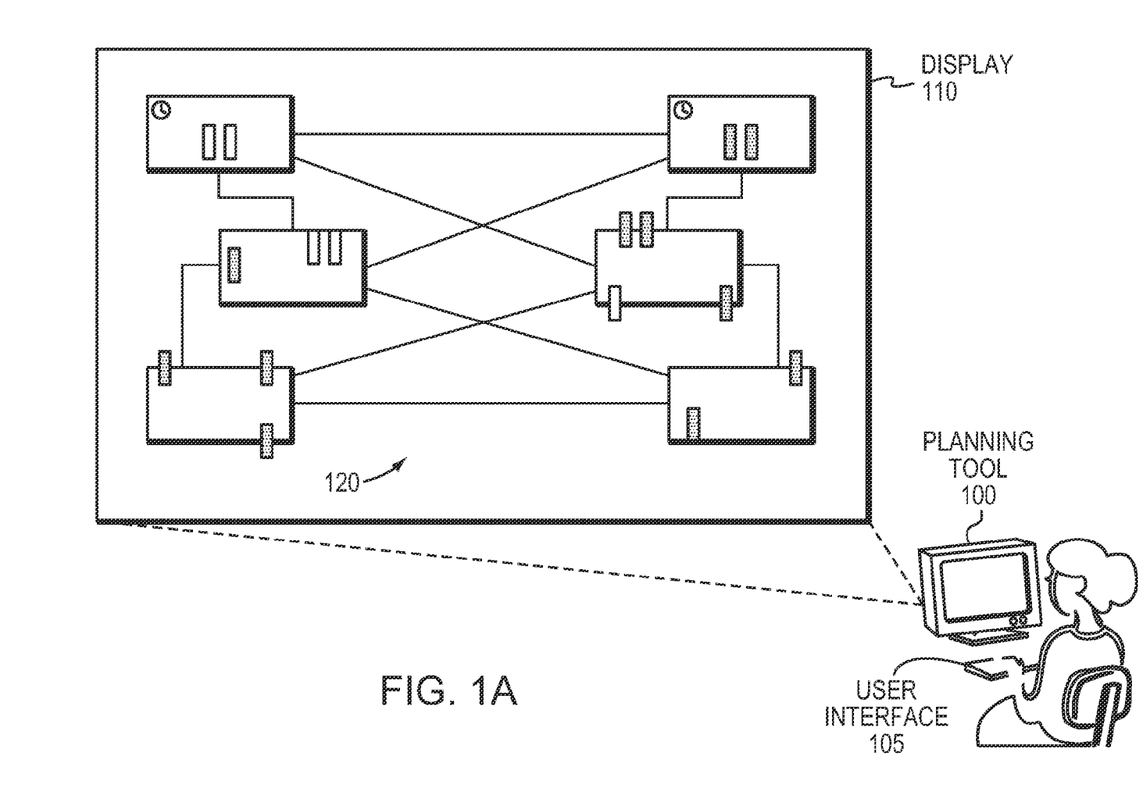
FIG. 1A is a schematic diagram illustrating an individual using a network planning tool, according to an example embodiment of the present invention.

FIG. 1A is a schematic diagram illustrating an individual using a network planning tool 100, according to an example embodiment of the present invention. The planning tool 100 may be used to plan the configuration of timing distribution in an optical network with a mesh topology. In such a network, Reconfigurable Add-Drop Multiplexers (ROADMs) are typically located at network nodes to add or drop signals, and amplifiers may be situated at or between network nodes to boost signal strength. To use the planning tool 100, a user begins by initializing a model of an optical mesh network 120 using a user interface 105, such as a keyboard, mouse, or touch-screen, and a display 110. The model of the optical network 120 may include information about network topology, such as the number and locations of nodes, fiber types and lengths; models of optical amplifiers, regenerators, transponders, and ROADMs; and models of optical signals.

Figure 1B:
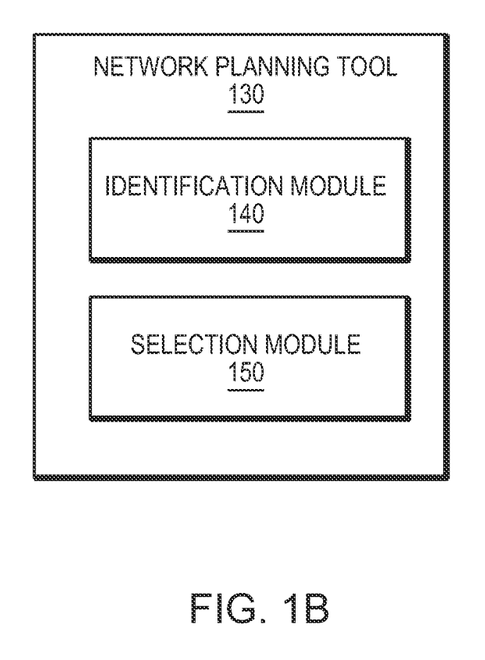
FIG. 1B is a block diagram illustrating modules of a network planning tool, according to an example embodiment of the present invention.

FIG. 1B is a block diagram illustrating example modules 140, 150 of a network planning tool 130, according to an example embodiment of the present invention. The modules 140, 150 of the example network planning tool 130 include an identification module 140 that identifies a source node associated with an external timing source, and that identifies optical light paths between nodes in the network. Also illustrated is a selection module 150 that selects, for nodes other than the source node, optical light paths originating either directly or indirectly from the source node to use to derive timing information.

Figure 2:
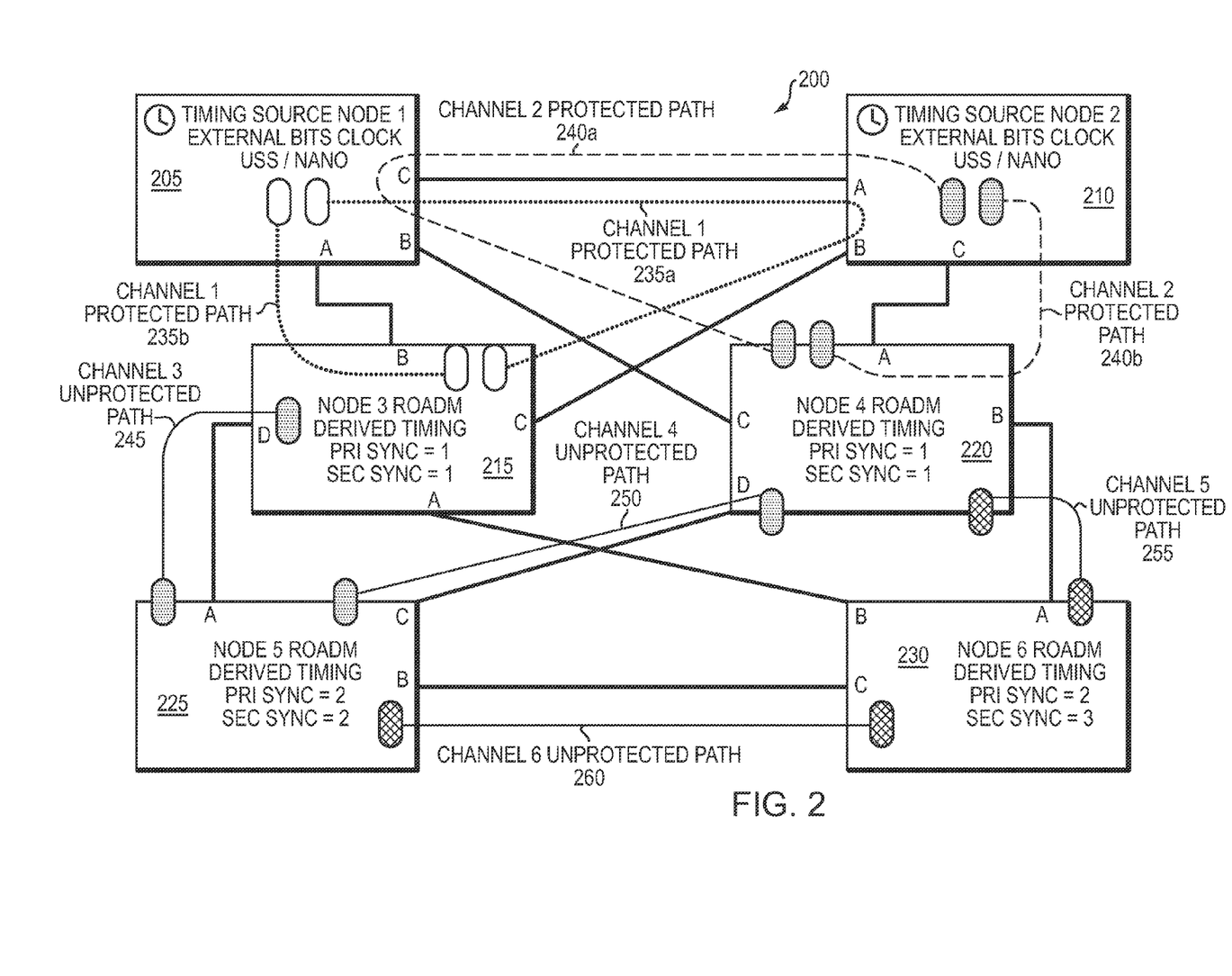
FIG. 2 is a block diagram illustrating a timing distribution configuration in an optical mesh network, according to an example embodiment of the present invention.

FIG. 2 is a block diagram illustrating a timing distribution configuration in an optical mesh network 200, according to an example embodiment of the present invention. The example optical mesh network 200 includes first and second source nodes 205, 210 that have external timing sources. The network also includes a "first set of nodes" (in this case, just one node 215), where the first set of nodes are network nodes other than the source nodes 205, 210. Similarly, the network also includes a "second set of nodes" (in this case, just one node 220), where the second set of nodes are network nodes other than the source nodes 205, 210 and the first set of nodes (node 215). The first set of nodes (node 215) derive timing information from the first source node 205 via at least two optical light paths 235a,b traversing diverse paths between the first source node 205 and the first set of nodes (node 215). The second set of nodes (node 220) derive timing information from the second source node 210 via at least two optical light paths 240a,b traversing diverse paths between the second source node 210 and the second set of nodes (node 220). The network also includes at least a "third set of nodes" (in this case, nodes 225 and 230), where the third set, or additional sets, of nodes (nodes 225 and 230) are network nodes other than the source nodes 205, 210 and the first and second sets of nodes (nodes 215 and 220), and where each node 225, 230 derives timing information via at least two optical light paths (245, 250 and 255, 260, respectively) originating from either one of the source nodes 205, 210 or from nodes belonging to the first or second sets of nodes (nodes 215 and 220).

Each node in the network may be associated with both a primary and secondary timing source. The secondary timing source is used to derive timing information if the primary timing source is unavailable. Each node may also include a "timing level" representing the number of successive optical light paths between the node and one of the source nodes. In such configurations, each node may be associated with the primary and secondary timing sources based on the timing levels of other nodes. In addition, at least some of the nodes may derive timing information via an optical supervisory channel from another node.

To plan distribution of network timing using the planning tool of FIG. 1A, a user identifies nodes that have external timing (e.g., a BITS clock), and "tags" these nodes as "timing sources." In the example network of FIG. 2, there are two nodes 205, 210 that have been supplied with an external BITS clock. The user may identify all (e.g., protected and unprotected) "traffic demands" between a node tagged as a timing source and all other nodes (other than those which have external timing). Traffic demands are implemented using optical light paths. Protected demands use paired traffic demands, and the remote add/drop node can derive primary and secondary timing using this pair of demands (pair of optical light paths). An example of a protected traffic demand from the source node 205 are optical paths 235a,b. Primary timing may be derived from the "active" side of the pair, and secondary timing may be derived from the "protect" side. When configuring the first set of nodes (node 215) that derive timing information from the sources nodes 205, the user may label the first set of nodes (node 215) as having a "SYNC level" of "1", indicating that the first set of nodes are one level away from the original timing source 205. For example, node 215 has a SYNC level of "1". Similarly, node 220 may also have a SYNC level of "1". It should be noted that the source nodes 205, 210 may be labeled as having a SYNC level of "0". The nodes 215, 220 with SYNC levels of "1" can now act as timing sources for additional nodes.

The user may also identify all (e.g., protected and unprotected) "traffic demands" between the source nodes 205, 210 and all other nodes (other than those which have external timing, and other than those already tagged with a SYNC level of "1"). That is, the user may exclude from consideration those traffic demands that terminate on remote nodes that already have derived timing (e.g., node 215). As above, protected demands use paired traffic demands, and the remote add/drop node can derive primary and secondary timing using this pair of demands (pair of optical light paths). An example of a protected traffic demand from source node 210 are optical paths 240a,b. Primary timing may be derived from the "active" side of the pair, and secondary timing may be derived from the "protect" side. When configuring this second set of nodes, the user may label the nodes as also having a SYNC level of "1", indicating that the nodes are one level away from one of the original timing sources. For example, node 220 has a SYNC level of "1".

For the remaining nodes 225, 230 of the network, the user may identify (1) unprotected demands that originate from the source nodes or (2) demands that originate from nodes with a SYNC level of "1". Of these identified demands, the user may select two path-diverse demands to derive timing at each remote node. "Path-diverse" means paths with as much path diversity across the network as possible and that arrive on the remote node on separate degrees. The demand that traverses the optical light path with a lesser failure probability (e.g., better signal-to-noise ratio) may be used to provide primary timing, while the other demand may provide secondary timing. The SYNC levels of these remote nodes depend on the SYNC levels of the nodes from which they derive timing information. In addition, the nodes may have different SYNC levels for its primary and secondary sources. For example, if the primary source is an unprotected demand originating from one of the source nodes, then the primary SYNC level is "1". If the secondary source is an unprotected demand originating from a node with a SYNC level of "1", then the secondary SYNC level of the node is "2". Again, these nodes may act as sources of timing for further nodes. In the network of FIG. 2, node 230 has a primary SYNC level of "2" because it derives primary timing from node 220, which has a SYNC level of "1". In addition, node 230 has a secondary SYNC level of "3" because it derives secondary timing from node 225, which has a SYNC level of "2".

After the user configures the distribution of timing, the network from a timing distribution perspective has "timing source nodes" 205, 210 (e.g., nodes with external BITS clock) "SYNC 1" nodes 215, 220 (e.g., those that have derived timing from the timing source nodes, and perhaps "SYNC 2" or "SYNC 3" nodes 225, 230 (e.g., those that have derived timing from the SYNC 1 or 2 nodes). SYNC 1, 2, and 3 nodes can also be used as timing sources for further nodes. Timing can be distributed to additional remote nodes using protected and unprotected demands that originate and terminate at nodes using the manner as described above. The SYNC level of nodes that derive timing from SYNC 1 nodes will be "2" and those that derive timing from SYNC 2 nodes will "3", and so on. As mentioned above, in a case of derived timing using unprotected demands, it is possible that the source nodes may be of different SYNC levels, in which case the primary and secondary timing SYNC levels at the remote node will be different.

Timing can also be distributed to nodes across the network using an Optical Supervisory Channel (OSC). To use the OSC, the user identifies one or more timing source nodes (e.g., nodes with external BITS clock). In addition, certain types of nodes that may include ROADMs or amplifier nodes may be capable of deriving and passing timing through the OSC (e.g., a NANO ROADM). The degree (e.g., port A, B, C)

and the node that the OSC is received from are recorded. No SYNC levels need be associated with OSC derived timing. A node that has derived primary and secondary timing from the OSC can then itself act as a timing source for other nodes. In some embodiments, distribution of timing includes use of both OSC-based derived timing and demand-based derived timing.

Using the planning tool of FIG. 1A, the user may view all the timing demands in a "topology window" as a "Timing Navigation Tree Node" for example. When the Timing Navigation Tree Node is selected, the tool may display a list of all timing demands in a "Details" tab of the presentation window. If a user tries to delete a demand used for timing, the planning tool may display a warning dialog that the user is about to delete a demand that is used to timing, and may require user confirmation before proceeding with the deletion. If the user modifies a timing tag for a demand, the tool may remove corresponding timing tags on all transponders associated with the demand. The tool may use this information to provide the user with "what if" fiber cuts. This allows the user to observe the impact of fiber cuts on the planned network timing distribution since fiber cuts would impact loss of the OSC, resulting in loss of primary or secondary timing to target nodes, and loss of the working or protect paths of demands, also resulting in loss of primary or secondary timing to target nodes.

Figure 3A:
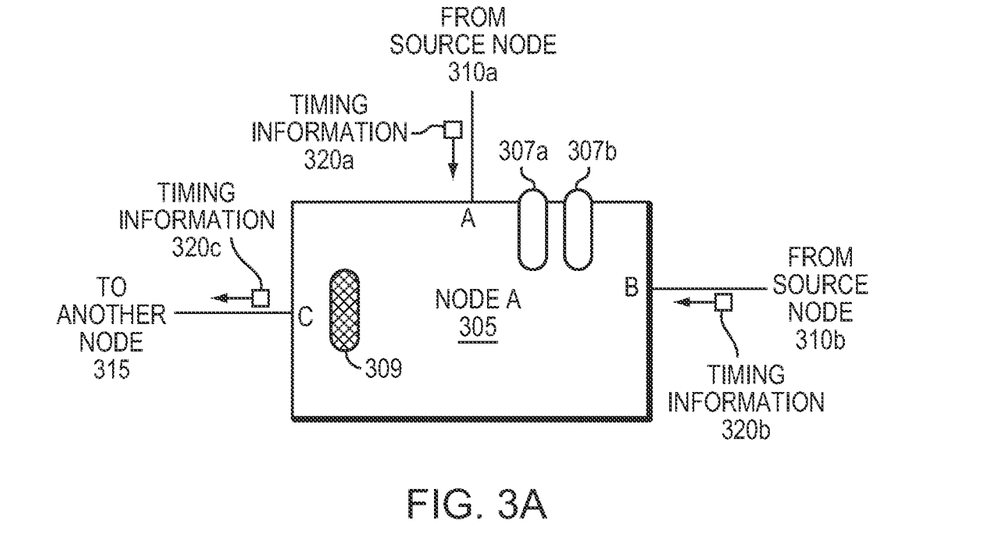
FIGS. 3A and 3B are block diagrams illustrating nodes in an optical mesh network configured to distribute timing information, according to an example embodiment of the present invention.
Figure 3B:
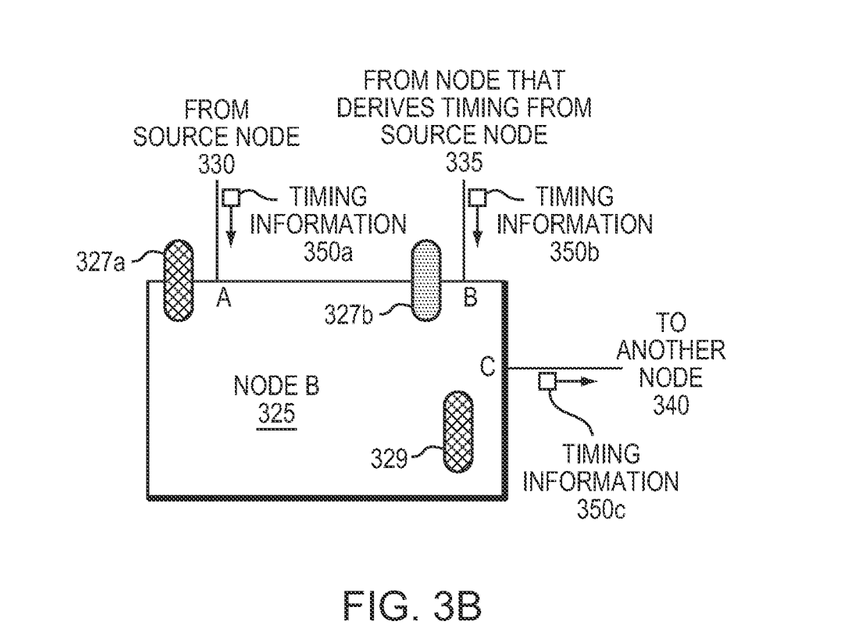

FIGS. 3A and 3B are block diagrams illustrating nodes 305, 325 in an optical mesh network configured to distribute timing information, according to an example embodiment of the present invention. The example nodes 305, 325 each include first and second transponders 307a,b, 327a,b. Each of the transponders 307a,b, 327a,b derive timing information 320a,b, 350a,b via optical light paths that originate from either a source node associated with an external timing source (e.g., node 310a) or another node that derives timing information via optical light paths originating directly or indirectly from the source node (e.g., node 335). Each node 305, 325 also includes a third transponder 309, 329 that transmits timing information 320c, 350c to another node 315, 340 via an additional optical light path.

The first and second transponders 307a,b, 327a,b may be designated as being either primary or secondary timing information sources based on which of the optical light paths used to derive timing information for the node is a more reliable optical light path. The node 305, 325 may also include an interface that derives timing information via an optical supervisory channel (not shown) from another node, in which case the first and second transponders 307a,b, 327a,b may be designated as being either primary or secondary timing information sources based on which of the optical light paths and the optical supervisory channel used to derive timing information for the node is a more reliable source.

Figure 4:
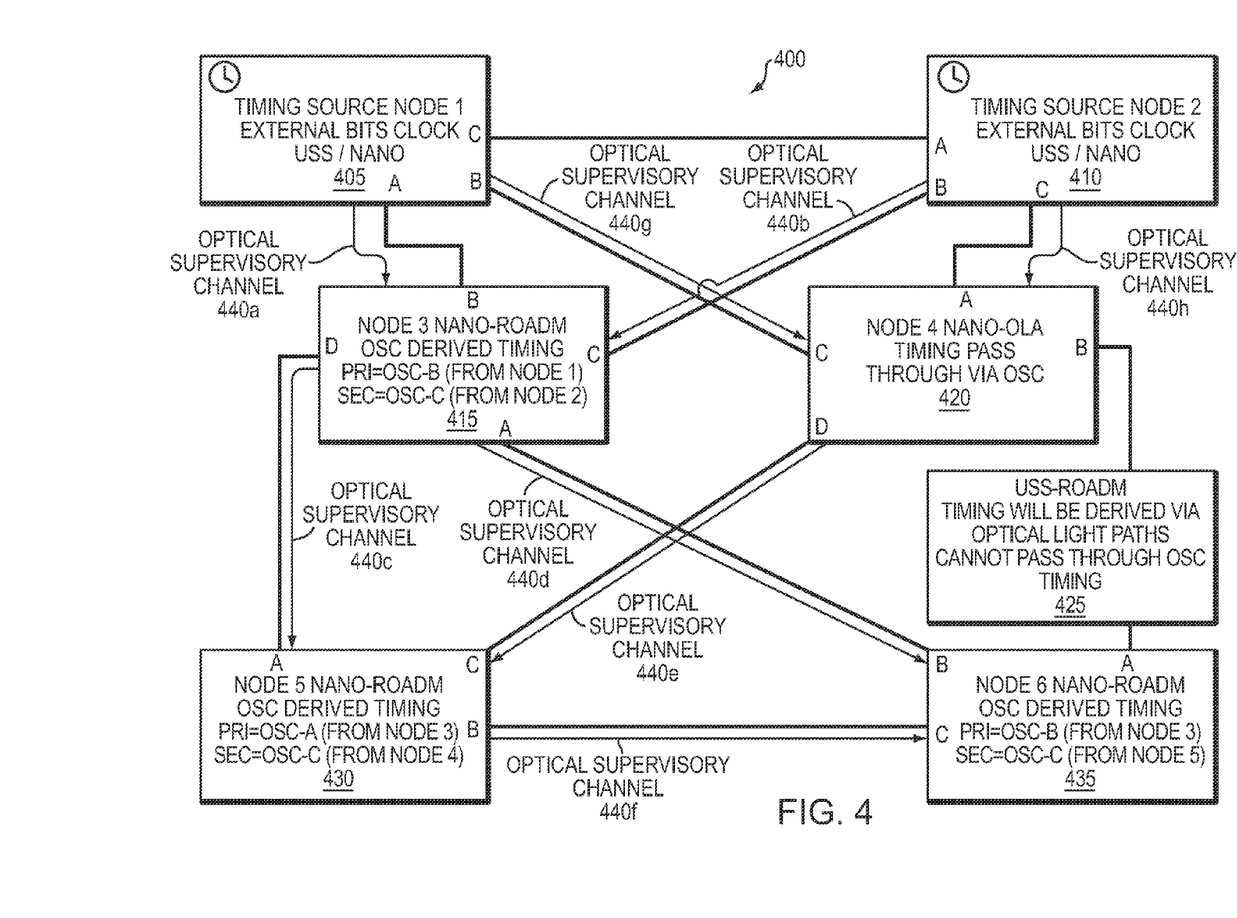
FIG. 4 is a block diagram illustrating a timing distribution configuration in an optical mesh network, according to an example embodiment of the present invention.

FIG. 4 is a block diagram illustrating a timing distribution configuration in an optical mesh network 400, according to an example embodiment of the present invention. As described above, timing can be distributed to nodes across the network 400 using an Optical Supervisory Channel (OSC) 440a-h. The example network configuration of FIG. 4 illustrates such use of the OSC. In the network of FIG. 4, nodes 415, 420, 430, and 435 derive timing using the OSC. Node 425, however, is a Universal Shell Solution (USS) ROADM and cannot derive timing from the OSC. This node 425 must derive timing using timing information transmitted over optical light paths serving the traffic demands, as described above in conjunction with FIGS. 2 and 3.

Figure 5:
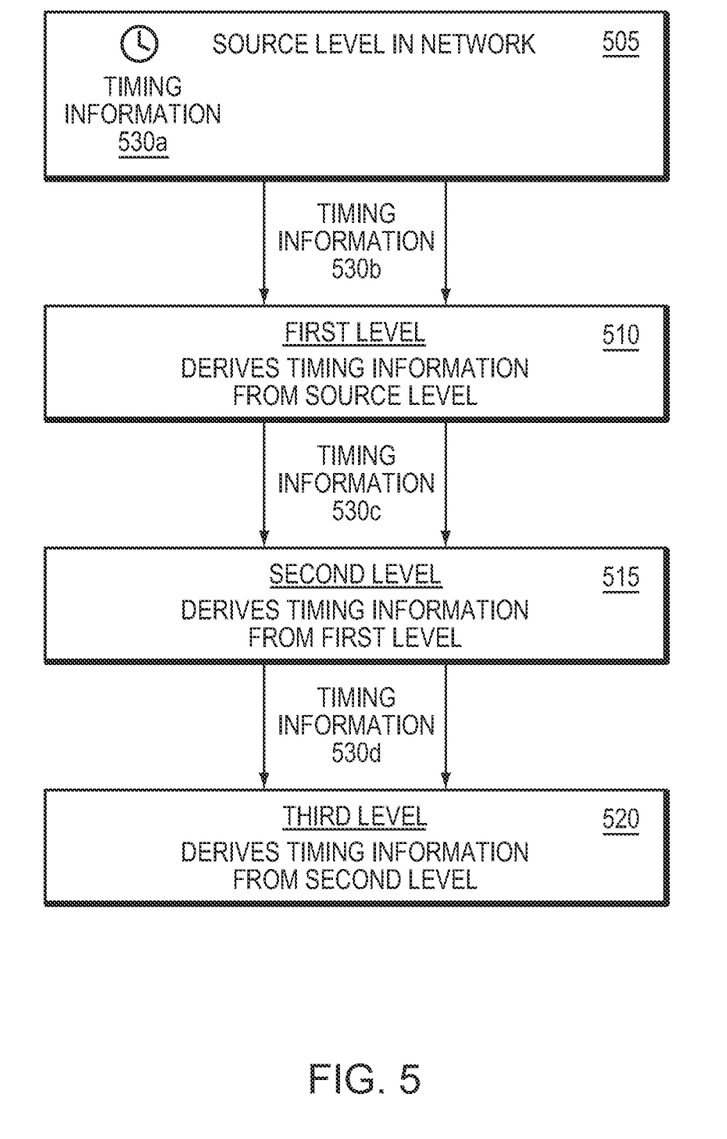
FIG. 5 is a block diagram illustrating timing distribution over multiple levels in an optical mesh network, according to an example embodiment of the present invention.

FIG. 5 is a block diagram illustrating timing distribution over multiple levels in an optical mesh network, according to an example embodiment of the present invention. A source level 505 (e.g., SYNC level "0") in the network provides timing information to another level 510 (e.g., SYNC level "1") in the network in communication with the source level via optical light paths (e.g., paths 235a,b of FIG. 2). Each subsequent level 515, 520 derives timing information from a level 510, 515 in the network that is closer to the source level 505, i.e., a level 515 is closer to the source level 505, as compared to another particular level 520, if it is separated from the source level 505 by fewer successive optical light paths than the particular level 520. For example, in FIG. 5, the First and Second Levels 510, 515 are closer to the Source Level 505 than the Third Level 520; thus, the Third Level 520 derives timing information from the First or Second Levels 510, 515.

Figure 6:
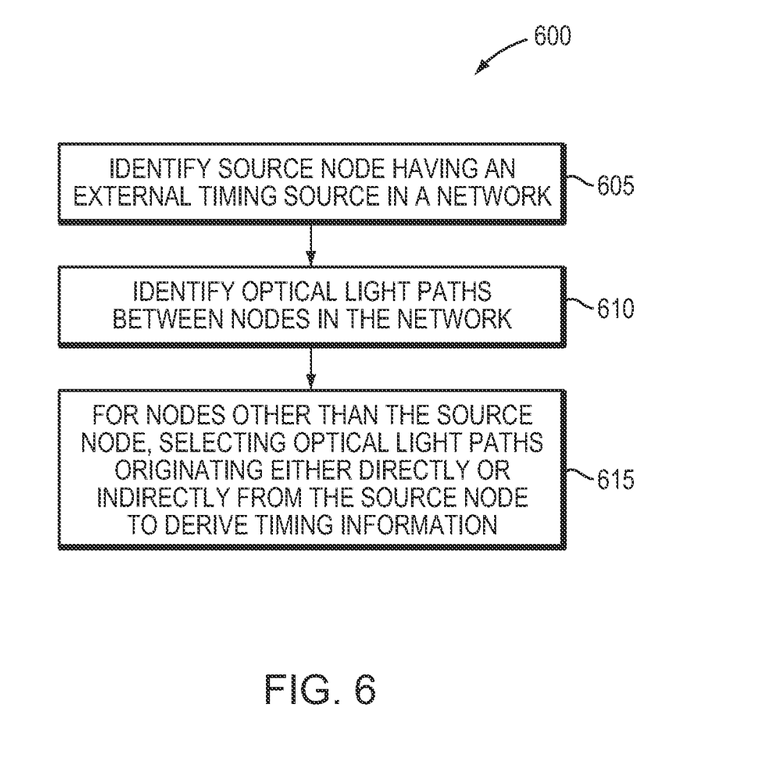
FIG. 6 is a flow diagram illustrating planning of timing distribution in an optical mesh network.

FIG. 6 is a flow diagram 600 illustrating planning of timing distribution in an optical mesh network. The flow diagram 600 depicts an example method that includes identifying (605) in the network a source node associated with an external timing source, identifying (610) optical light paths between nodes in the network, and, for nodes other than the source node, selecting (615) optical light paths originating either directly or indirectly from the source node to use to derive timing information.

Figure 7:
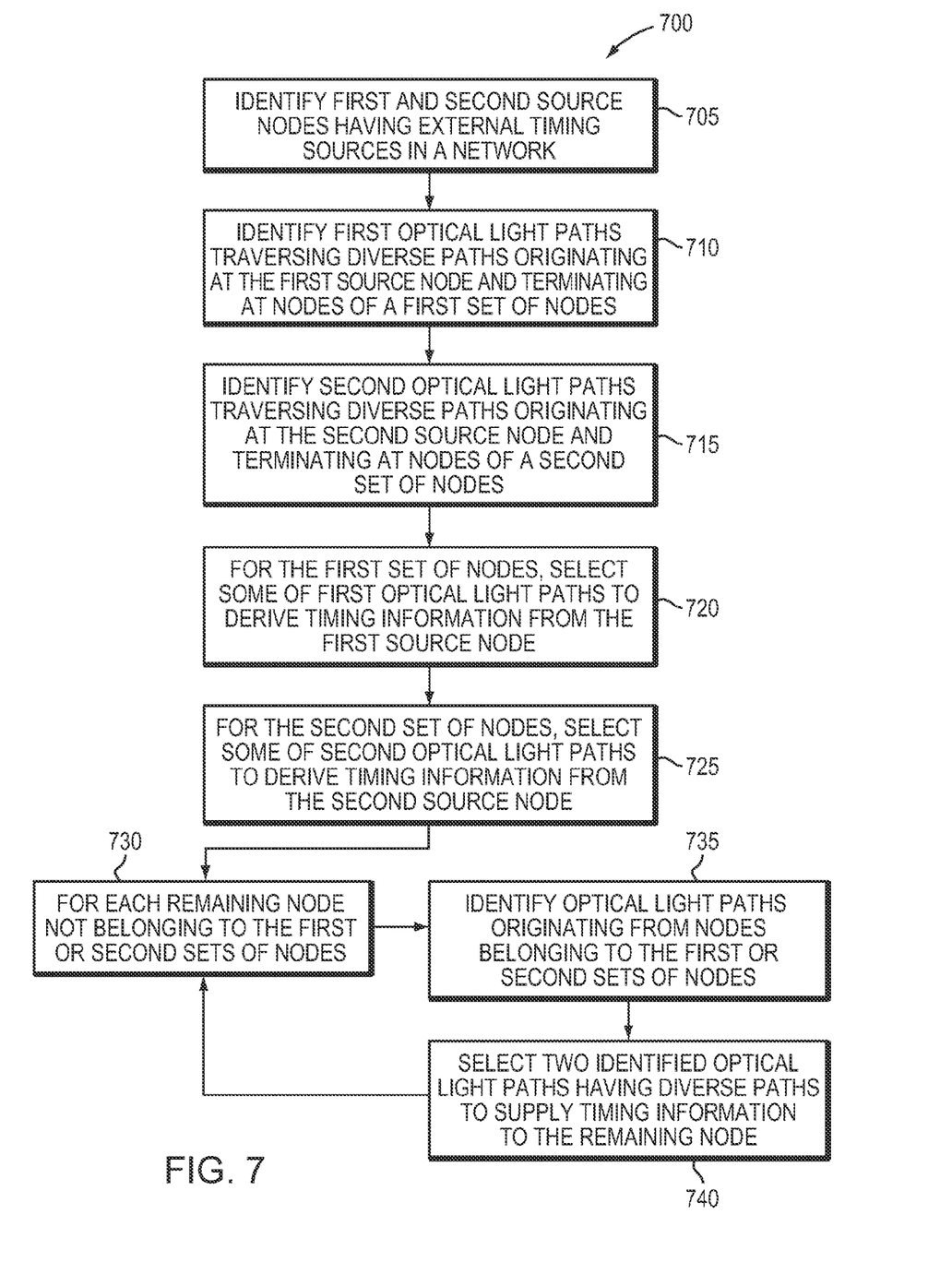
FIG. 7 is a detailed flow diagram illustrating planning of timing distribution in an optical mesh network.

FIG. 7 is a detailed flow diagram 700 illustrating planning of timing distribution in an optical mesh network. The detailed flow diagram 700 depicts an example method in which a source node is identified by identifying (705) first and second source nodes in the network that have external timing sources. In this example, optical light paths are identified by identifying (710) at least two "first" optical light paths traversing diverse paths that originate at the first source node and that terminate at nodes of a "first set of nodes," where the first set of nodes are network nodes other than the source nodes. Similarly, optical light paths are identified by identifying (715) at least two "second" optical light paths traversing diverse paths that originate at the second source node and that terminate at nodes of a "second set of nodes," where the second set of nodes are network nodes other than the source nodes and the first set of nodes. In the example method, both the first and second optical light paths have transponders associated with the first source node that are capable of transmitting synchronization timing, and both the first and second sets of nodes are capable of deriving the synchronization timing from the optical light paths. For the first set of nodes, at least some of the first optical light paths are selected (720) to derive timing information from the first source node. Similarly, for the second set of nodes, at least some of the second optical light paths are selected (725) to derive timing information from the second source node. For each (730) remaining network node (i.e., nodes in the network that do not belong to the first or second sets of nodes), optical light paths that originate from nodes belonging to the first or second sets of nodes are identified (735), and two of any of the identified optical light paths having diverse paths are selected (740) to supply timing information to each remaining network node, respectively.

Further methods include identifying primary and secondary timing sources for a given node, where the secondary timing source is used to derive timing information if the primary timing source is unavailable. In addition, it may be determined which of the optical light paths used to derive timing information for a given node has the more desirable optical characteristics or follows a more reliable path, and that optical light path may be selected as the primary timing source. Further methods include configuring at least a subset of the network nodes to derive information via an optical supervisory channel from other nodes, and for a given node, either an optical light path or the optical supervisory channel may be selected to use to derive timing information. In addition, it may be determined which, from among the optical light paths and optical supervisory channels, is a more reliable source, and that source may be selected as the primary timing source. Other methods may involve indicating a timing level for each node, where, for a given node, the timing level represents the number of successive optical light paths between the given node and one of the source nodes. In these methods, the timing level of other nodes may be used to determine from which node a particular node is to derive timing information.

While this invention has been particularly shown and described with references to example embodiments thereof, it will be understood by those skilled in the art that various changes in form and details may be made therein without departing from the scope of the invention encompassed by the appended claims.

Various embodiments of the invention have been described with specific configurations for ease of description. However, the invention need not be limited to the embodiments described and shown in the figures. For example, while the examples show two source nodes, there may be any number of source nodes. Similarly there may be any number of nodes at each level of nodes below the source nodes. Additionally, while two timing inputs for a node are shown, the number of timing inputs may vary for a given node and/or configuration.

Further, it should be understood that the flow diagrams of FIGS. 6 and 7 are examples that can include more or fewer components, can be partitioned into subunits, and can be implemented in different combinations. Moreover, the flow diagrams may be implemented in hardware, firmware, or software. If implemented in software, the software may be written in any software language suitable for use in networks and nodes as illustrated in FIGS. 2-4. The software may be embodied on any form of computer readable medium, such as RAM, ROM, or magnetic or optical disk, and loaded and executed by generic or custom processor(s). While described and illustrated using mesh networks, the disclosed embodiments are applicable to any network topology in which distribution of timing information is needed.

What is claimed is:

1. A computer-implemented method of planning a distribution of timing in an optical mesh network, the computer-implemented method comprising, by a processor and associated memory:
    identifying, according to a planned timing distribution, a source node associated with an external timing source in the optical mesh network;
    identifying, according to the planned timing distribution, optical light paths between nodes in the optical mesh network; and
    for nodes other than the source node, selecting, according to the planned timing distribution, optical light paths within the optical mesh network originating either directly or indirectly from the source node to use to derive timing information,
    wherein identifying optical light paths includes identifying at least two first optical light paths traversing diverse paths originating at the source node and terminating at one or more nodes of a first set of nodes, the first set of nodes being network nodes other than the source node,
    further comprising identifying primary and secondary timing sources for a given node, the secondary timing source being used to derive timing information if the primary timing source is unavailable;
    determining which one of the optical light paths used to derive timing information for the given node has more desirable optical characteristics, compared with at least one other of the optical light paths used to derive timing information; and
    selecting the determined optical light path as the primary timing source.

2. A computer-implemented method as in claim 1 wherein identifying optical light paths further includes identifying at least two second optical light paths traversing diverse paths originating at a second source node and terminating at one or more nodes of a second set of nodes, the second set of nodes being network nodes other than the source nodes and the first set of nodes.

3. A computer-implemented method as in claim 2 wherein identifying optical light paths further includes for each remaining network node not belonging to the first or second sets of nodes, identifying optical light paths originating from nodes belonging to the first or second sets of nodes, and wherein selecting optical light paths includes:
    for the first set of nodes, selecting some of the first optical light paths to derive timing information from the source node;
    for the second set of nodes, selecting some of the second optical light paths to derive timing information from the second source node; and
    for each remaining network node not belonging to the first or second sets of nodes, selecting two of any of the identified optical light paths having diverse paths to supply timing information to the remaining network node.

4. A computer-implemented method as in claim 2 wherein the first optical light paths and the second optical light paths include transponders associated with the source nodes capable of transmitting synchronization timing, and wherein the first and second sets of nodes are capable of deriving the synchronization timing.

5. A computer-implemented method as in claim 1 further comprising:
    selecting, for at least a subset of the network nodes, an optical supervisory channel from other nodes to use to derive timing information.

6. A computer-implemented method as in claim 5 further comprising:
    for a given node, selecting to derive timing information from either an optical light path or the optical supervisory channel.

7. A computer-implemented method as in claim 1 further comprising:
    indicating a timing level for a given node, the timing level representing the number of successive optical light paths between the given node and one of the source nodes.

8. A computer-implemented method as in claim 7 further comprising:
    for a given node, using the timing level of other nodes to determine from which other node the node is to derive timing information.

9. The computer-implemented method of claim 1, further comprising terminating the diverse paths at separate degrees of the one or more nodes of the first set of nodes.

10. A computer-implemented method comprising:
    identifying, according to a planned timing distribution, a source node associated with an external timing source in the optical mesh network;
    identifying, according to the planned timing distribution, optical light paths between nodes in the optical mesh network; and for nodes other than the source node, selecting, according to the planned timing distribution, optical light paths within the optical mesh network originating either directly or indirectly from the source node to use to derive timing information, wherein identifying optical light paths includes identifying at least two first optical light paths traversing diverse paths originating at the source node and terminating at one or more nodes of a first set of nodes, the first set of nodes being network nodes other than the source node, further comprising identifying primary and secondary timing sources for a given node, the secondary timing source being used to derive timing information if the primary timing source is unavailable;

determining which from among the optical light paths and optical supervisory channels used to derive timing information for the given node has more desirable optical characteristics, compared with at least one other of the optical light paths and optical supervisory channels; and selecting the determined optical light path or optical supervisory channel as the primary timing source.

11. An optical mesh network comprising:

first and second source nodes associated with external timing sources;

a first set of nodes, the first set of nodes being network nodes other than the source nodes, and being configured, according to a planned timing distribution, to derive timing information from the first source node via at least two optical light paths within the optical mesh network traversing diverse paths between the first source node and the first set of nodes;

a second set of nodes, the second set of nodes being network nodes other than the source nodes and the first set of nodes, and being configured, according to the planned timing distribution, to derive timing information from the second source node via at least two optical light paths within the optical mesh network traversing diverse paths between the second source node and the second set of nodes; and a third set of nodes, the third set of nodes being network nodes other than the source nodes and the first and second sets of nodes, and each node being configured, according to the planned timing distribution, to derive timing information via at least two optical light paths within the optical mesh network originating from one of the source nodes or from nodes belonging to the first or second sets of nodes, wherein each node is associated with primary and secondary timing sources, the secondary timing source being used to derive timing information for a given node if the primary timing source is unavailable, wherein at least a subset of the nodes are configured to derive timing information via an optical supervisory channel from another node, wherein each node determines which, from among the optical supervisory channels used to derive timing information for the given node, has more desirable optical characteristics, compared with at least one other of the optical supervisory channels; and the given node selects the determined optical supervisory channel as the primary timing source.

12. An optical mesh network as in claim 11 wherein each node includes a timing level representing the number of successive optical light paths between the node and one of the source nodes.

13. An optical mesh network as in claim 12 wherein each node is associated with primary and secondary timing sources based on the timing levels of other nodes.

14. A node in an optical mesh network, the node comprising:

first and second transponders each configured, according to a planned timing distribution, to derive timing information via optical light paths within the optical mesh network originating from either a source node associated with an external timing source or another node that derives timing information via optical light paths within the optical mesh network originating directly or indirectly from the source node;

a third transponder configured, according to the planned timing distribution, to transmit timing information to another node via at least one additional optical light path within the optical mesh network; and an interface configured to derive timing information via an optical supervisory channel from another node, and wherein the first and second transponders are designated as being either primary or secondary timing information sources based on which of the optical light paths and the optical supervisory channel used to derive timing information for the node has more desirable optical characteristics, compared with at least one other of the optical light paths used to derive timing information;

wherein the optical light paths include at least two diverse paths.

15. A node as in claim 14 further comprising:

an interface configured to derive timing information via an optical supervisory channel from another node.

16. A computer-implemented system planning the distribution of timing in an optical mesh network, the system comprising, by a processor and associated memory:

a computer-implemented identification module configured, according to a planned timing distribution, to identify in the network a source node associated with an external timing source, and configured, according to the planned timing distribution, to identify optical light paths within the optical mesh network between nodes in the network; and a computer-implemented selection module configured, according to the planned timing distribution, for nodes other than the source node, to select optical light paths within the optical mesh network originating either directly or indirectly from the source node to use to derive timing information, the computer-implemented identification module further configured to identify primary and secondary timing sources for a given node, the secondary timing source being used to derive timing information if the primary timing source is unavailable;

the computer-implemented selection module further configured to determine which one of the optical light paths used to derive timing information for the given node has more desirable optical characteristics, compared with at least one other of the optical light paths used to derive timing information; and the computer-implemented selection module further configured to select the determined optical light path as the primary timing source.

17. A computer-implemented method of planning a distribution of timing in an optical mesh network, the computer-implemented method comprising, by a processor and associated memory:

identifying, according to a planned timing distribution, a source node associated with an external timing source in the optical mesh network;

identifying, according to the planned timing distribution, optical light paths between nodes in the optical mesh network; and for nodes other than the source node, selecting, according to the planned timing distribution, optical light paths within the optical mesh network originating either directly or indirectly from the source node to use to derive timing information, wherein identifying optical light paths includes identifying at least two first optical light paths traversing diverse paths originating at the source node and terminating at one or more nodes of a first set of nodes, the first set of nodes being network nodes other than the source node, further comprising identifying primary and secondary timing sources for a given node, the secondary timing source being used to derive timing information if the primary timing source is unavailable;

determining which one of the optical light paths used to derive timing information for the given node has more desirable optical characteristics, compared with at least one other of the optical light paths used to derive timing information; and selecting the determined optical light path as the primary timing source.

18. The computer-implemented method of claim 17, wherein the identified traffic demands and the selected traffic demands include a protected traffic demand, an un-protected traffic demand, and a path-diverse traffic demand.

19. The computer-implemented method of claim 17, further comprising enabling simulated modification of given traffic demands and providing an observation of at least one impact of the simulated modification, wherein the given traffic demands include at least one of the identified traffic demands and the selected traffic demands.

* * * * *